United States Patent
Sasaki

(10) Patent No.: US 11,080,873 B2
(45) Date of Patent: Aug. 3, 2021

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Takashi Sasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 16/505,072

(22) Filed: Jul. 8, 2019

(65) Prior Publication Data

US 2020/0013175 A1    Jan. 9, 2020

(30) Foreign Application Priority Data

Jul. 9, 2018    (JP) .............................. JP2018-130009

(51) Int. Cl.
*G06T 7/50*    (2017.01)

(52) U.S. Cl.
CPC ...... *G06T 7/50* (2017.01); *G06T 2207/20028* (2013.01)

(58) Field of Classification Search
CPC . G06T 7/50; G06T 5/002; G06T 2207/20012; G06T 2207/30196; G06T 2207/20028; G06T 2207/10028
See application file for complete search history.

(56) References Cited

U.S. PATENT DOCUMENTS

| 2016/0021298 A1* | 1/2016 | Tsutsumi ........... H04N 5/23212 348/349 |
| 2016/0086051 A1* | 3/2016 | Piekniewski ........ G06K 9/4623 382/103 |
| 2017/0200283 A1* | 7/2017 | Yamaguchi ........ H04N 5/23245 |
| 2018/0033127 A1* | 2/2018 | Sasaki .................. G06K 9/4604 |
| 2018/0259743 A1* | 9/2018 | Sasaki ................ H04N 5/23212 |

FOREIGN PATENT DOCUMENTS

| JP | 2008-015754 A | 1/2008 |
| JP | 5448912 B2 | 3/2014 |
| JP | 2017-011652 A | 1/2017 |

* cited by examiner

*Primary Examiner* — Brenda C Bernardi
(74) *Attorney, Agent, or Firm* — Cowan, Liebowitz & Latman, P.C.

(57) ABSTRACT

There is provided an image processing apparatus. An obtaining unit obtains a distance map and a shot image, the distance map representing a distribution of information related to a distance in a depth direction of a shooting range using a distribution of distance values, the shot image corresponding to the shooting range. A first filter unit applies a first filter to the distance map. A second filter unit applies a second filter to the distance map to which the first filter has been applied. The first filter is a filter that reduces a distribution of distance values in a predetermined distance value range in the distance map. The second filter is a filter that changes a distance value of a target distance in the distance map using weighted averaging.

16 Claims, 10 Drawing Sheets

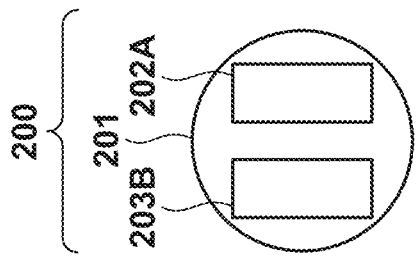
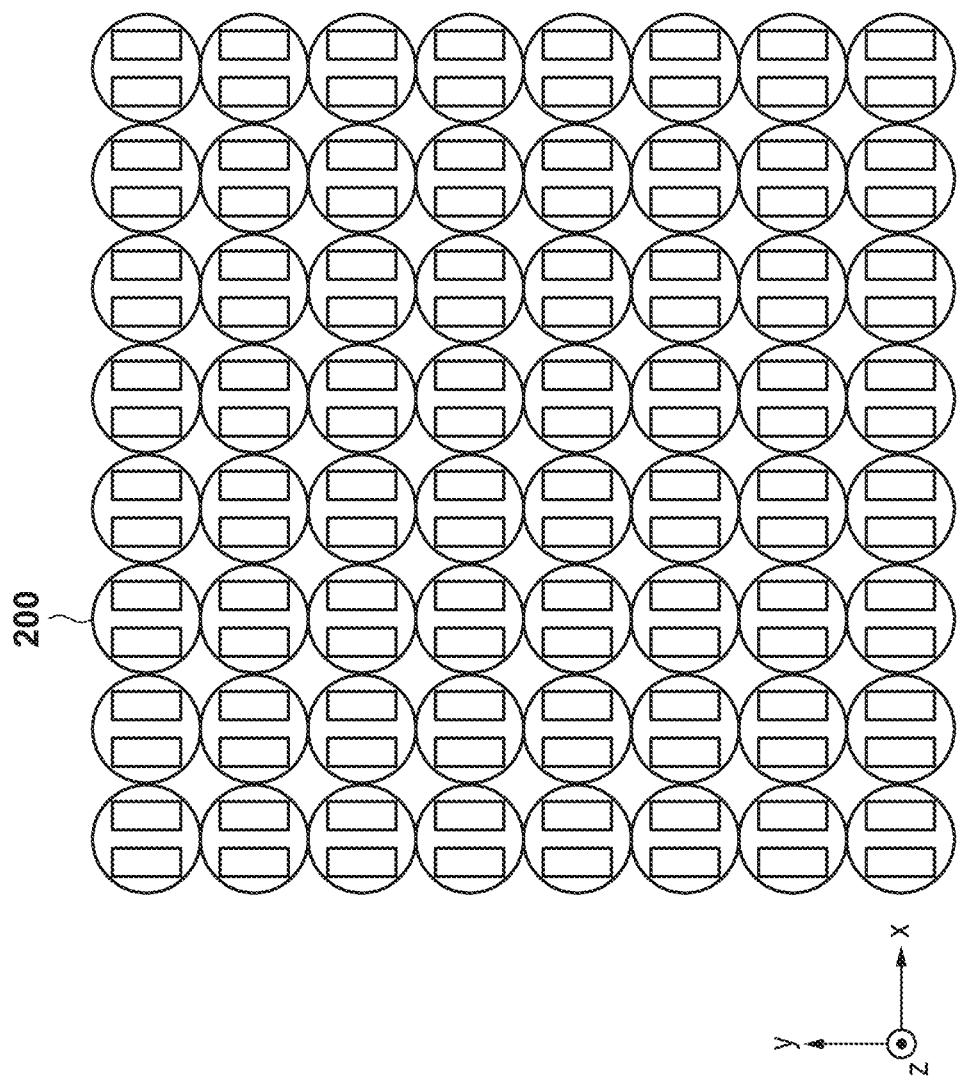

FIG. 8A
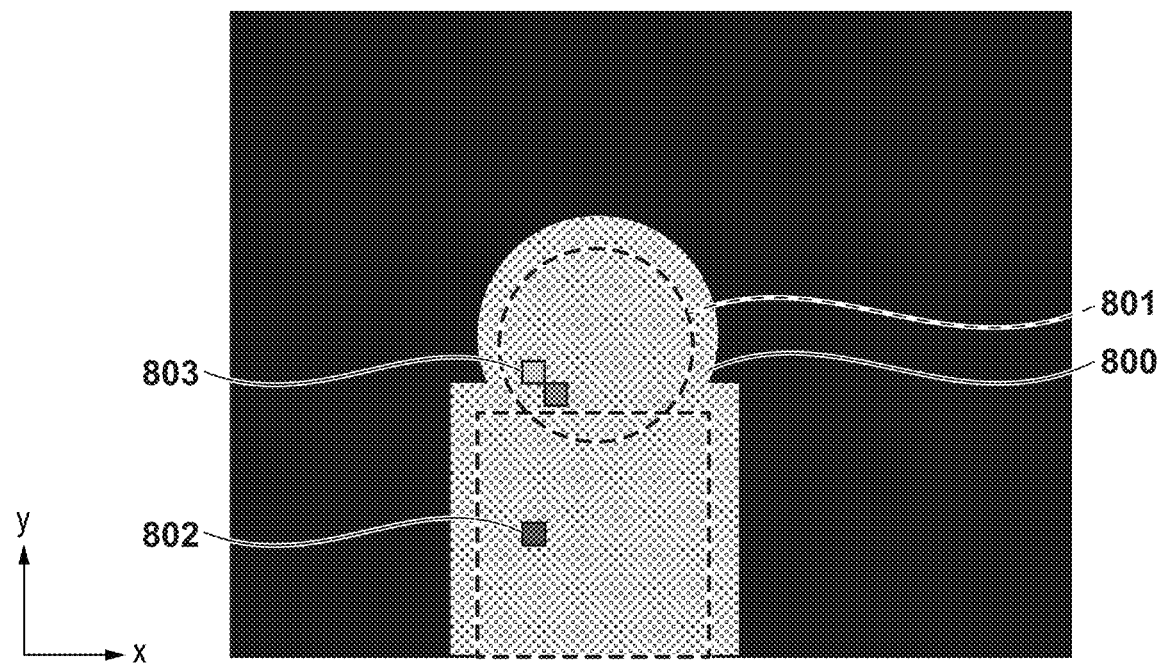
FIG. 8B
FIG. 8C
FIG. 8D
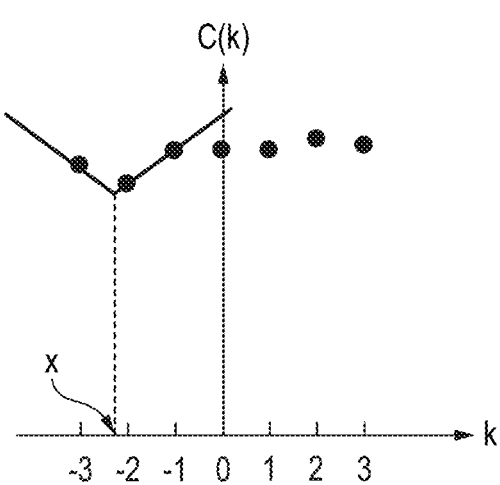

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to an image processing apparatus, an image capturing apparatus, an image processing method, and a storage medium.

Description of the Related Art

There is a known technique to shoot a pair of images with predetermined parallax, and apply image processing of adding blur to an image using a distribution of information related to a subject distance obtained based on the pair of images. As a method of calculating a distribution of information related to a subject distance, Japanese Patent Laid-Open No. 2008-15754 discloses a method of calculating a defocus amount distribution based on a shift amount between two pieces of pixel data while relatively shifting a pixel data pair in a minute block.

When a defocus amount distribution is calculated on a per-block basis based on a shift amount between a pixel data pair as in Japanese Patent Laid-Open No. 2008-15754, a defocus amount distribution that expands to the outside of a subject region is generated. If a background region is extracted from the expanding defocus amount distribution and blurring processing is applied to this background region, a background image near a boundary between a subject and a background becomes clear. That is, there has been a problem of unnatural blur in a region of the boundary between the subject and the background.

SUMMARY OF THE INVENTION

The present invention has been made in view of the foregoing situation, and provides a technique to improve the accuracy of a distribution of information related to a subject distance.

According to a first aspect of the present invention, there is provided an image processing apparatus comprising: one or more processors; and a memory storing instructions which, when executed by the one or more processors, cause the image processing apparatus to function as: an obtaining unit configured to obtain a distance map and a shot image, the distance map representing a distribution of information related to a distance in a depth direction of a shooting range using a distribution of distance values, the shot image corresponding to the shooting range, a first filter unit configured to apply a first filter to the distance map, and a second filter unit configured to apply a second filter to the distance map to which the first filter has been applied, wherein the first filter is a filter that reduces a distribution of distance values in a predetermined distance value range in the distance map, and the second filter is a filter that changes a distance value of a target distance in the distance map using weighted averaging that gives more weight to a distance value that is closer in position to the target distance.

According to a second aspect of the present invention, there is provided an image processing apparatus comprising: one or more processors; and a memory storing instructions which, when executed by the one or more processors, cause the image processing apparatus to function as: an obtaining unit configured to obtain a distance map and a shot image, the distance map representing a distribution of information related to a distance in a depth direction of a shooting range using a distribution of distance values, the shot image corresponding to the shooting range, a generation unit configured to generate an object region map which indicates an object region having a distance value in a predetermined distance value range in the distance map, wherein in the object region map, the object region has a pixel value included in a first pixel value range and a region other than the object region has a pixel value included in a second pixel value range that does not overlap the first pixel value range, a first filter unit configured to apply a first filter to the object region map, and a second filter unit configured to apply a second filter to the object region map to which the first filter has been applied, wherein a number of bits for a pixel value in the object region map is smaller than a number of bits for a distance value in the distance map, the first filter is a filter that reduces the object region in the object region map, and the second filter is a filter that changes a pixel value of a target pixel in the object region map so that a similarity between the target pixel and a plurality of surrounding pixels in the object region map becomes close to a similarity between the target pixel and the plurality of surrounding pixels in the shot image.

According to a third aspect of the present invention, there is provided an image capturing apparatus, comprising: the image processing apparatus according to the first aspect; and an image capturing unit.

According to a fourth aspect of the present invention, there is provided an image processing method executed by an image processing apparatus, comprising: obtaining a distance map and a shot image, the distance map representing a distribution of information related to a distance in a depth direction of a shooting range using a distribution of distance values, the shot image corresponding to the shooting range, applying a first filter to the distance map, and applying a second filter to the distance map to which the first filter has been applied, wherein the first filter is a filter that reduces a distribution of distance values in a predetermined distance value range in the distance map, and the second filter is a filter that changes a distance value of a target distance in the distance map using weighted averaging that gives more weight to a distance value that is closer in position to the target distance.

According to a fifth aspect of the present invention, there is provided an image processing method executed by an image processing apparatus, comprising: obtaining a distance map and a shot image, the distance map representing a distribution of information related to a distance in a depth direction of a shooting range using a distribution of distance values, the shot image corresponding to the shooting range, generating an object region map which indicates an object region having a distance value in a predetermined distance value range in the distance map, wherein in the object region map, the object region has a pixel value included in a first pixel value range and a region other than the object region has a pixel value included in a second pixel value range that does not overlap the first pixel value range, applying a first filter to the object region map, and applying a second filter to the object region map to which the first filter has been applied, wherein a number of bits for a pixel value in the object region map is smaller than a number of bits for a distance value in the distance map, the first filter is a filter that reduces the object region in the object region map, and the second filter is a filter that changes a pixel value of a target pixel in the object region map so that a similarity between the target pixel and a plurality of surrounding pixels in the object region map becomes close to a similarity between the target pixel and the plurality of surrounding pixels in the shot image.

According to a sixth aspect of the present invention, there is provided a non-transitory computer-readable storage medium which stores a program for causing a computer to execute an image processing method comprising: obtaining a distance map and a shot image, the distance map representing a distribution of information related to a distance in a depth direction of a shooting range using a distribution of distance values, the shot image corresponding to the shooting range, applying a first filter to the distance map, and applying a second filter to the distance map to which the first filter has been applied, wherein the first filter is a filter that reduces a distribution of distance values in a predetermined distance value range in the distance map, and the second filter is a filter that changes a distance value of a target distance in the distance map using weighted averaging that gives more weight to a distance value that is closer in position to the target distance.

According to a seventh aspect of the present invention, there is provided a non-transitory computer-readable storage medium which stores a program for causing a computer to execute an image processing method comprising: obtaining a distance map and a shot image, the distance map representing a distribution of information related to a distance in a depth direction of a shooting range using a distribution of distance values, the shot image corresponding to the shooting range, generating an object region map which indicates an object region having a distance value in a predetermined distance value range in the distance map, wherein in the object region map, the object region has a pixel value included in a first pixel value range and a region other than the object region has a pixel value included in a second pixel value range that does not overlap the first pixel value range, applying a first filter to the object region map, and applying a second filter to the object region map to which the first filter has been applied, wherein a number of bits for a pixel value in the object region map is smaller than a number of bits for a distance value in the distance map, the first filter is a filter that reduces the object region in the object region map, and the second filter is a filter that changes a pixel value of a target pixel in the object region map so that a similarity between the target pixel and a plurality of surrounding pixels in the object region map becomes close to a similarity between the target pixel and the plurality of surrounding pixels in the shot image.

Further features of the present invention will become apparent from the following description of exemplary embodiments with reference to the attached drawings.

BRIEF DESCRIPTION OF THE DRAWINGS

FIG. 2A is a diagram showing an array configuration of pixels in an image capturing unit 105 of FIG. 1.

FIG. 2B is an enlarged view of pixels 200 shown in FIG. 2A.

FIG. 8A is a diagram showing an example of a defocus map.

FIG. 8B is a diagram showing an outlier in the defocus map.

FIG. 8C is a diagram showing a local minimum value of a correlation amount C(k).

FIG. 8D is a diagram showing unevenness in the defocus map.

DESCRIPTION OF THE EMBODIMENTS

Figure 1:
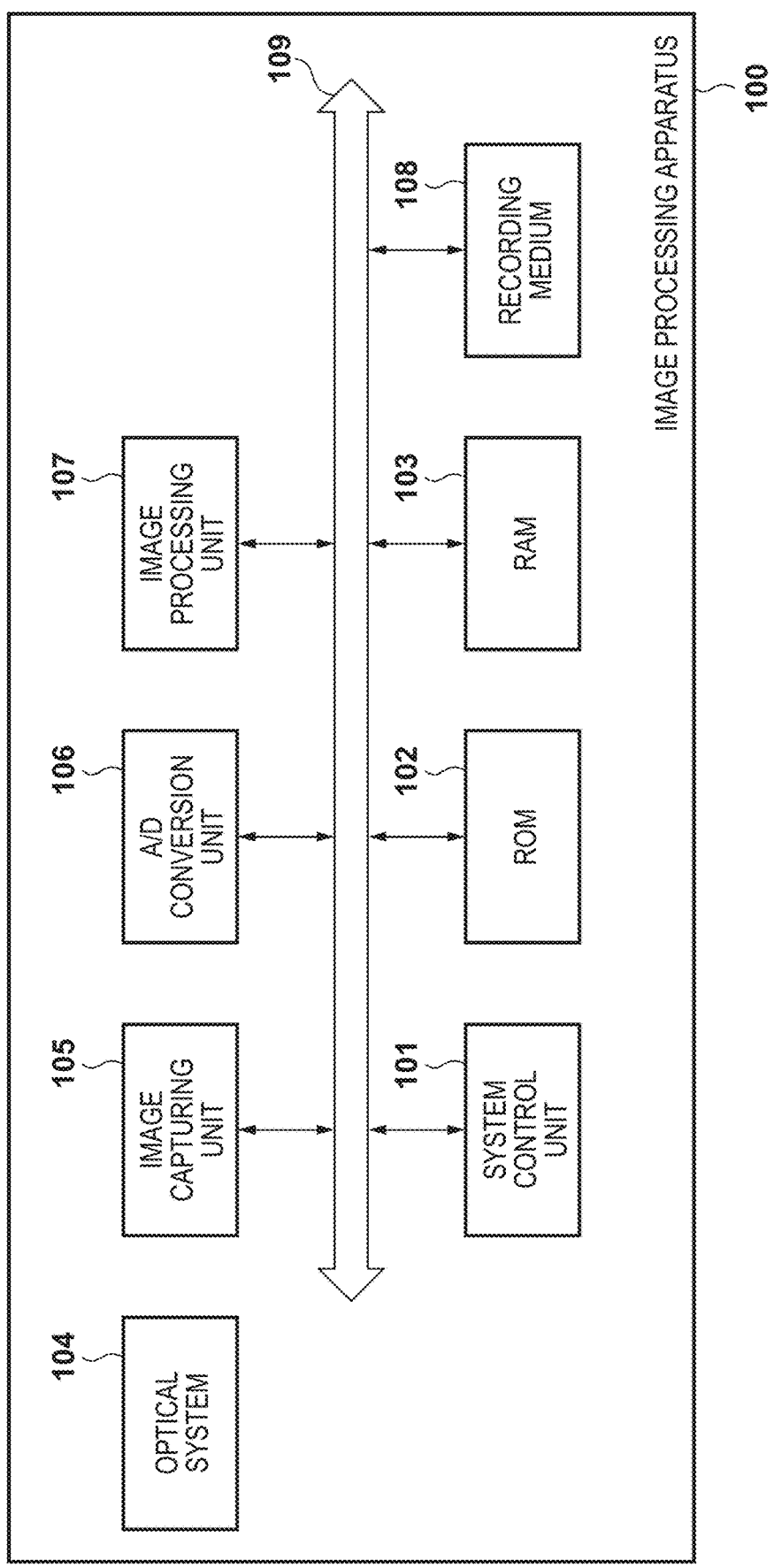
FIG. 1 is a block diagram showing a functional configuration of an image processing apparatus 100.

Hereinafter, embodiments of the present invention will be described with reference to the attached drawings. Elements that are given the same reference numerals throughout all of the attached drawings represent the same or similar elements. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

First Embodiment

FIG. 1 is a block diagram showing a functional configuration of an image processing apparatus 100. In the following description, it will be assumed that the image processing apparatus 100 is a digital camera. However, the image processing apparatus 100 of the present embodiment is not limited to the digital camera, and may be, for example, a personal computer or the like.

First, an example of processing executed by the image processing apparatus 100 of the present embodiment will be briefly described. The image processing apparatus 100 obtains a defocus amount distribution (hereinafter also referred to as "defocus map") as a distribution of information related to a subject distance. Then, in order to remove outliers and unevenness included in the defocus map, the image processing apparatus 100 applies a median filter to the defocus map. Next, the image processing apparatus 100 applies, to the defocus map, a filter (for example, a minimum filter) that reduces defocus amounts expanding to the outside of a subject region. Finally, the image processing apparatus 100 extracts an object region based on the defocus map to which the filters have been applied. This can suppress the formation of holes in the object region attributed to outliers and unevenness included in the defocus map, and suppress the expansion of the object region attributed to the expansion of the defocus amounts.

The first embodiment will be described in detail below. As shown in FIG. 1, the image processing apparatus 100 includes a system control unit 101, a ROM 102, and a RAM 103. The image processing apparatus 100 also includes an optical system 104, an image capturing unit 105, an A/D conversion unit 106, an image processing unit 107, a recording medium 108, and a bus 109. Each of the system control unit 101, ROM 102, RAM 103, image capturing unit 105, A/D conversion unit 106, image processing unit 107, and recording medium 108 is connected to the bus 109.

The system control unit 101 controls an entirety of the image processing apparatus 100, and is, for example, a CPU. The system control unit 101 controls the operations of respective blocks included in the image processing apparatus 100 by reading out operation programs for respective blocks included in the image processing apparatus 100 from the ROM 102, deploying the operation programs to the RAM 103, and executing the operation programs.

The ROM 102 is a rewritable nonvolatile memory; for example, a flash ROM or the like is used thereas. In addition to the operation programs for respective blocks included in the image processing apparatus 100, for example, parameters necessary for the operations of respective blocks are stored in the ROM 102.

The RAM 103 is a rewritable volatile memory, and is used as a temporary storage area for data that is output in the operations of respective blocks included in the image processing apparatus 100. The system control unit 101 and the image processing unit 107 use the RAM 103 as a work memory.

The optical system 104 forms a subject image on the image capturing unit 105. The optical system 104 includes, for example, a fixed lens, a varifocal lens that changes a focal length, a focusing lens that performs focus adjustment, and the like. The optical system 104 also includes a diaphragm, and a light amount is adjusted at the time of shooting by adjusting the aperture diameter of the optical system using the diaphragm.

The image capturing unit 105 is an image sensor, such as a CCD image sensor and a CMOS image sensor, for example. The image capturing unit 105 obtains an analog image signal by photoelectrically converting an optical image that has been formed on the image sensor by the optical system 104. The image capturing unit 105 outputs the obtained analog image signal to the A/D conversion unit 106.

The A/D conversion unit 106 obtains digital image data by applying A/D conversion processing to the input analog image signal. The A/D conversion unit 106 outputs/stores the obtained digital image data to/in the RAM 103.

The image processing unit 107 performs image processing with respect to image data stored in the RAM 103. Specifically, the image processing unit 107 performs processing of, for example, white balance adjustment, color interpolation, scaling up/down, and the like. The image processing unit 107 also performs various types of image processing, such as generation of a defocus map and filter processing. The image processing unit 107 records an image after the image processing in the recording medium 108.

The recording medium 108 is, for example, a memory card or the like that is attachable to and removable from the image processing apparatus 100. Image data that has been processed by the image processing unit 107 and stored in the RAM 103, image data that has undergone A/D conversion in the A/D conversion unit 106, and the like are recorded in the recording medium 108 as recorded images.

Respective blocks of the image processing apparatus 100 are connected by the bus 109. The respective blocks exchange signals via the bus 109.

FIG. 2A is a diagram showing an array configuration of pixels in the image capturing unit 105 of FIG. 1. As shown in FIG. 2A, in the image capturing unit 105, a plurality of pixels 200 are arrayed two-dimensionally and regularly. Specifically, the plurality of pixels 200 are arrayed in, for example, a two-dimensional grid-like fashion. Note that the array configuration of the pixels 200 is not limited to the grid-like array configuration, and other array configurations may be adopted.

FIG. 2B is an enlarged view of the pixels 200 shown in FIG. 2A. As shown in FIG. 2B, each pixel 200 includes a microlens 201 and a pair of pupil division pixels 202A, 203B composed of a pair of photoelectric conversion units. The pupil division pixels 202A, 203B have the same planar shape, and each of them has a planar rectangular shape whose longitudinal direction extends along a y-axis direction. In each pixel 200, the pupil division pixels 202A, 203B are arranged so as to be axisymmetric with respect to a symmetry axis represented by a perpendicular bisector of the microlens 201 extending along the y-axis direction. Note that the planar shape of the pupil division pixels 202A, 203B is not limited to the above-described shape, and other planar shapes may be adopted. Furthermore, the mode of arrangement of the pupil division pixels 202A, 203B is not limited to the above-described mode of arrangement, and other modes of arrangement may be adopted.

In the present embodiment, it will be assumed that an A image and a B image are output as parallax images respectively from the pupil division pixels 202A, 203B that are arrayed two-dimensionally and regularly. By configuring the image capturing unit 105 as shown in FIGS. 2A and 2B, a pair of light beams that pass through different regions of a pupil of the optical system 104 can be formed as a pair of optical images, and this pair of optical images can be output as an A image and a B image. The image processing unit 107 generates a defocus map by performing phase-difference detection, which will be described later, with reference to these A image and B image.

Note that a method of obtaining the A image and the B image is not limited to the above-described method, and various types of methods can be adopted. For example, images with parallax that have been obtained by a plurality of image capturing apparatuses, such as cameras that are placed with a spatial gap therebetween, may be used as the A image and the B image. Furthermore, parallax images obtained by one image capturing apparatus, such as a camera including a plurality of optical systems and image capturing units, may be respectively used as the A image and the B image.

Figure 3:
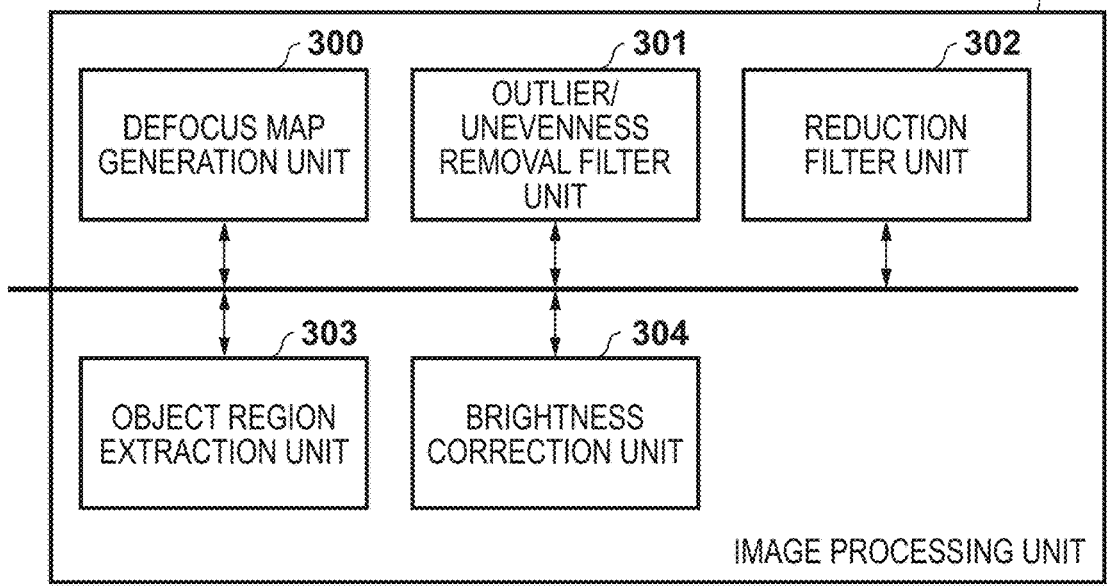
FIG. 3 is a block diagram showing an example of a specific configuration of an image processing unit 107 of the image processing apparatus 100 according to a first embodiment.

FIG. 3 is a block diagram showing an example of a specific configuration of the image processing unit 107 of the image processing apparatus 100 according to the first embodiment. As shown in FIG. 3, the image processing unit 107 includes a defocus map generation unit 300, an outlier/unevenness removal filter unit 301, a reduction filter unit 302, an object region extraction unit 303, and a brightness correction unit 304.

Figure 4:
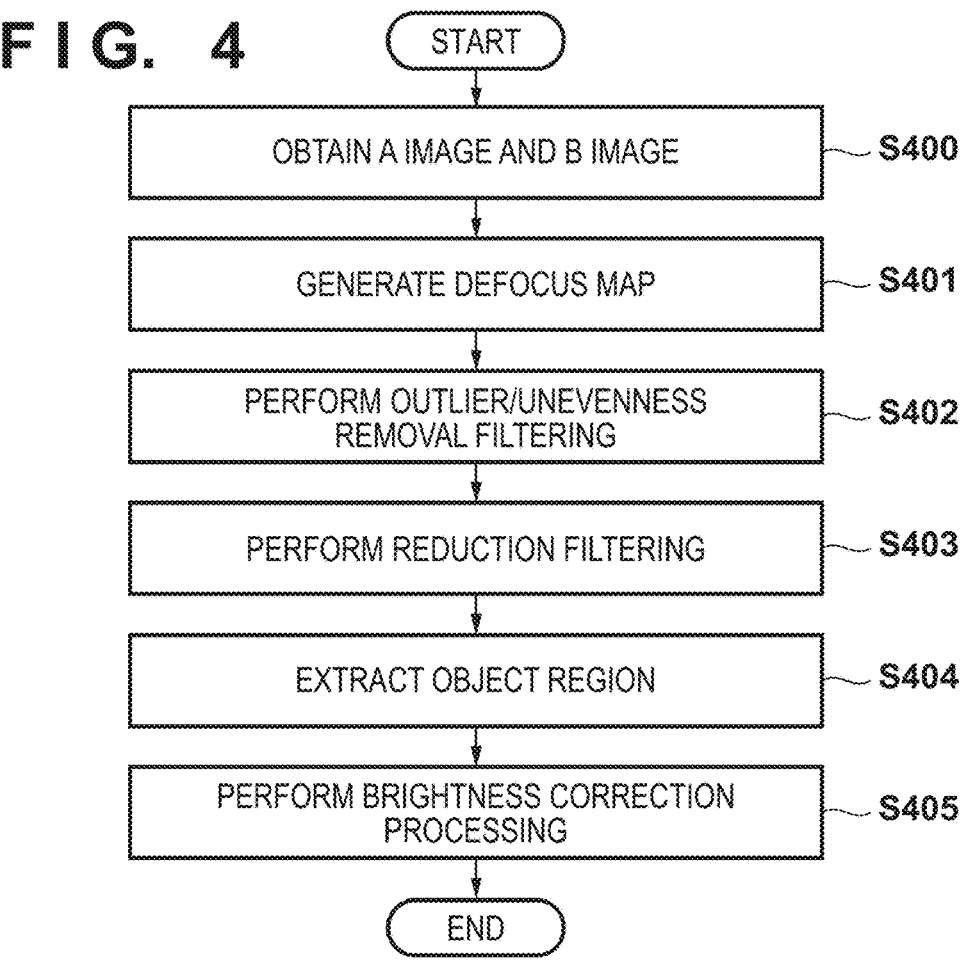
FIG. 4 is a flowchart of image processing executed by the image processing unit 107 according to the first embodiment.

With reference to FIG. 4, the following describes image processing executed by the image processing unit 107. FIG. 4 is a flowchart of the image processing executed by the image processing unit 107 according to the first embodiment. The image processing unit 107 executes the image processing of the present flowchart under control of the system control unit 101.

In step S400, the image processing unit 107 obtains an A image and a B image, which are a pair of parallax images. At this time, the image processing apparatus 100 generates the A image and the B image by performing image capturing using the image capturing unit 105. Alternatively, the image processing apparatus 100 may have the A image and the B image recorded in the recording medium 108 in advance. In this case, the image processing unit 107 obtains the A image and the B image from the recording medium 108. Furthermore, the image processing apparatus 100 may add the A image and the B image, and record the result of the addition as an image for still image recording in the recording medium 108.

Figure 5:
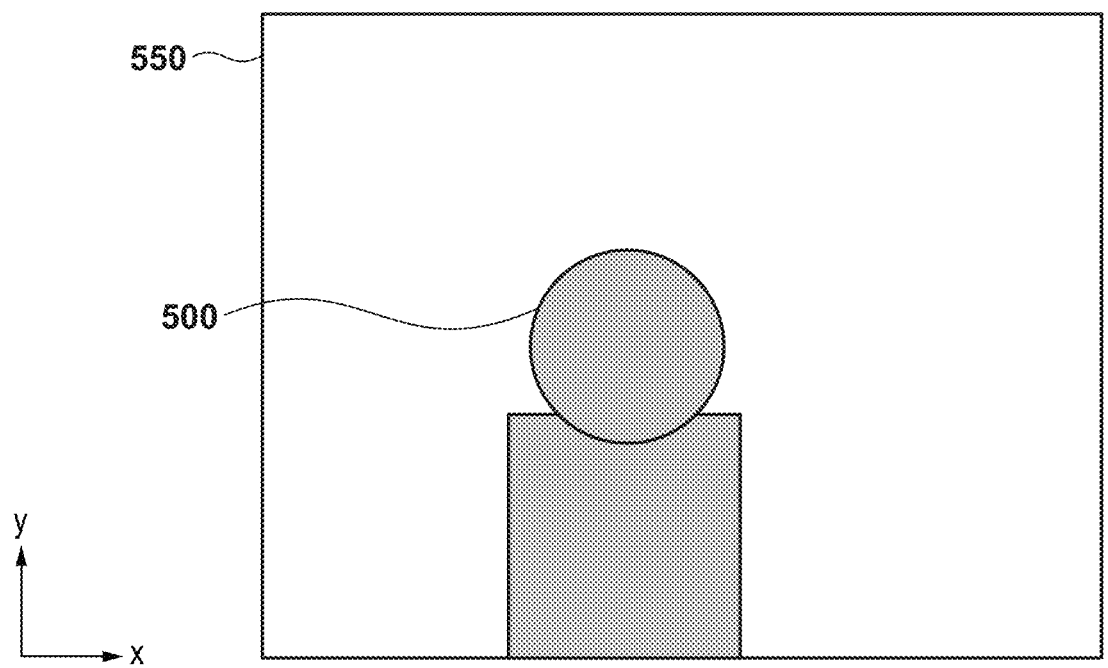
FIG. 5 is a diagram showing an example of an image for still image recording.

FIG. 5 shows an example of the image for still image recording. An image 550 is an image obtained by adding the A image and the B image, and a focused subject 500 exists at the center of a background region.

In step S401, using the A image and the B image obtained in step S400, the defocus map generation unit 300 calculates defocus amounts at respective pixel positions as a distribution of information related to a subject distance. As a method of calculating defocus amounts by detecting phase differences between the A image and the B image, for example, a method disclosed in Japanese Patent Laid-Open No. 2008-15754 can be used. Below, the method of calculating defocus amounts will be described in detail.

A data series of the A image and a data series of the B image in a minute block centered on a target pixel position are generalized and represented as E(1) to E(m) and F(1) to F(m), respectively. Note that m denotes the number of pieces of data. In this case, a correlation amount C(k) corresponding to a shift amount k between the two data series is computed, using Expression 1, while relatively shifting the data series F(1) to F(m) relative to the data series E(1) to E(m).

$$C(k)=\Sigma|E(n)-F(n+k)| \quad \text{Expression 1}$$

In Expression 1, the Σ operation is calculated for n. The range of n and n+k in this Σ operation is limited to the range of 1 to m. Furthermore, the shift amount k is an integer, and is a relative shift amount based on a detection pitch for an image data pair.

Figure 6:
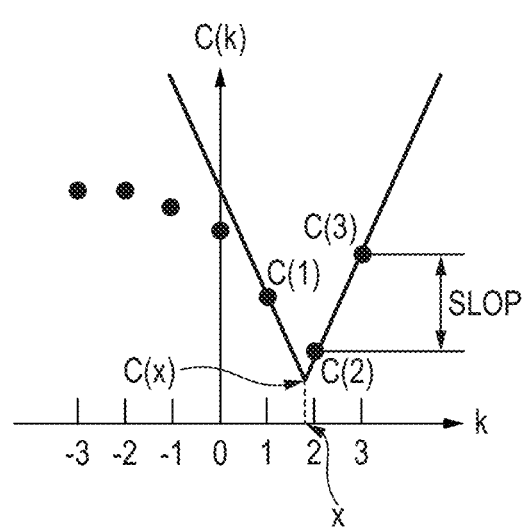
FIG. 6 is a diagram illustrating a method of calculating a defocus amount.

FIG. 6 shows, as an example of the result of computation of Expression 1, a graph in which the shift amount k is taken along a horizontal axis and the correlation amount C(k) is taken along a vertical axis. As can be understood from FIG. 6, the correlation amount C(k) is minimum at the shift amount k that shows high correlation between the pair of data series. Then, using a three-point interpolation method of the following Expressions 2 to 5, a shift amount x that provides a minimum value C(x) with respect to consecutive correlation amounts is calculated and obtained.

$$x=kj+D/SLOP \quad \text{Expression 2}$$

$$C(x)=C(kj)-|D| \quad \text{Expression 3}$$

$$D=\{C(kj-1)-C(kj+1)\}/2 \quad \text{Expression 4}$$

$$SLOP=\text{MAX}\{C(kj+1)-C(kj),C(kj-1)-C(kj)\} \quad \text{Expression 5}$$

Here, kj is k at which a discrete correlation amount C(k) is minimum. In the example shown in FIG. 6, kj is 2.

Based on the shift amount x obtained using Expression 2, a defocus amount DEF with respect to a planned image forming surface of a subject image surface can be obtained using the following Expression 6.

$$DEF=KX\cdot PY\cdot x \quad \text{Expression 6}$$

In Expression 6, PY is a detection pitch, and KX is a conversion coefficient determined by the magnitude of the opening angle of the center of mass of a pair of light beams passing through the pupil.

Figure 7:
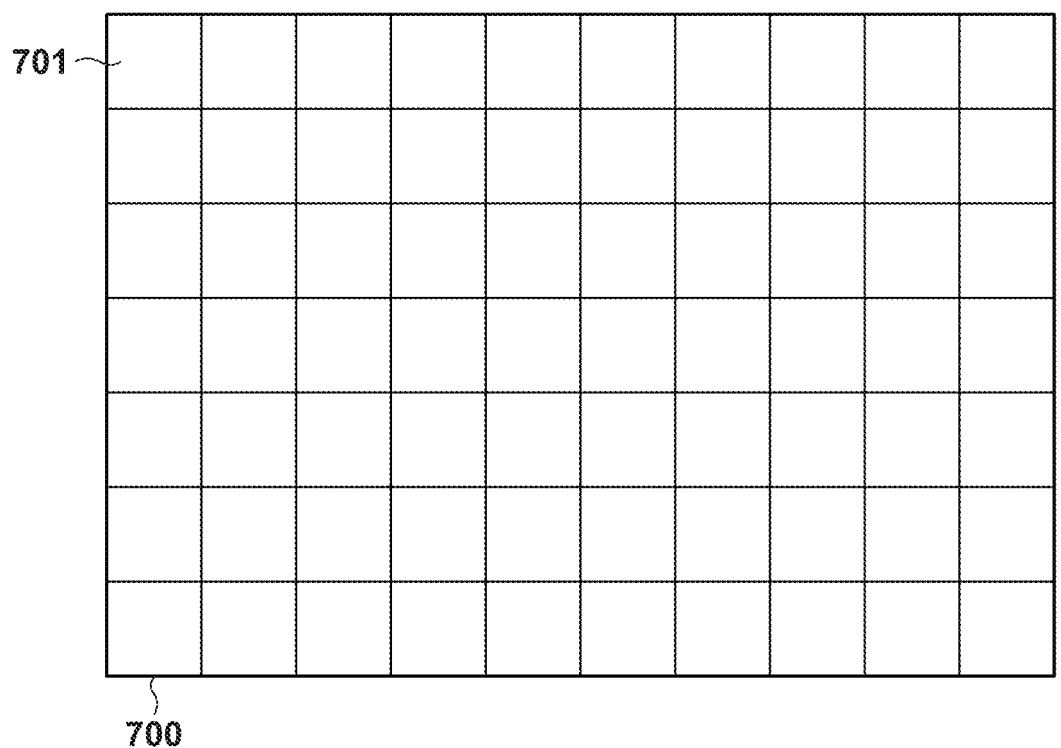
FIG. 7 is a diagram showing division of a screen into minute blocks.

A screen 700 is divided into minute blocks 701 (m×m size) as shown in FIG. 7, and defocus amounts are calculated for the respective minute blocks using Expression 6. It will be assumed here that the size m of one side of a minute block is 7. Furthermore, in the following description, the shift amount x may also be referred to as parallax.

In the present embodiment, it will be assumed that the defocus map generation unit 300 converts negative signals into positive values by adding certain values to defocus amounts of Expression 6, and then outputs the result of conversion represented in an 8-bit grayscale as a defocus map. In the defocus map thus generated, a distribution of information related to a distance in a depth direction of a shooting range is represented by a distribution of pixel values.

Note that a method of calculating values of the defocus map is not limited to the above-described method, and it is possible to adopt, for example, a configuration that outputs absolute values of defocus amounts of Expression 6 as the defocus map. Furthermore, it is possible to adopt a configuration in which a distribution of information related to a subject distance, including the defocus map, is recorded in the recording medium 108 in advance, and the image processing unit 107 obtains the distribution by reading out the distribution.

FIG. 8A shows an example of the generated defocus map. In the defocus map shown in FIG. 8A, the closer to the front (the shorter the distance), the whiter (the larger the pixel value). In FIG. 8A, a region 800 represents a region of the defocus amounts of the subject, and a boundary 801 indicated by a dashed line represents a boundary of the subject 500 in FIG. 5. That is, it can be understood that the distribution of the defocus amounts of the subject expands to the outside of the region of the subject 500. Note that in the present embodiment, it will be assumed that a pixel value of a defocus amount indicating a focused state in the defocus map is 128. Furthermore, the width by which the region 800 expands from the boundary of the subject 500 is half the size m of the minute blocks for which the defocus amounts are calculated, and is 3 here.

A pixel 802 of FIG. 8A corresponds to an outlier in the generated defocus map. FIG. 8B shows the pixel 802 and eight pixels surrounding the same, together with pixel values representing the defocus amounts of these pixels. The reason why the pixel value of the pixel 802 is low is because the correlation between the pair of data series is low and corresponds to a local minimum value of the correlation amount C(k) shown in FIG. 8C. An outlier is easily detected from an outfit that has almost no pattern, the sky with a few changes in luminance, the sun with high luminance, and the like.

A pixel 803 of FIG. 8A corresponds to unevenness in the generated defocus map. FIG. 8D shows the pixel 803 and eight pixels surrounding the same in a region in which unevenness has occurred, together with pixel values representing the defocus amounts of these pixels. The reason why unevenness occurs in the defocus map will be described below.

By using the aforementioned three-point interpolation method, a shift amount x and a defocus amount that provide a minimum value C(x) with respect to consecutive correlation amounts can be obtained. It can be understood that, at this time, even if C(kj) has the same value, the obtained shift amount x and defocus amount change if the magnitude relationship of C(kj+1), C(kj−1) changes. From this, it can be understood that, even if target pixels exist within the same subject and C(kj) has the same value, the defocus amounts fluctuate and unevenness occurs in the defocus map as the magnitude relationship of C(kj+1), C(kj−1) changes due to the influence of a change in the pattern of the subject.

Furthermore, as the S/N ratio (signal-to-noise ratio) varies among pixels of the image sensor used as the image capturing unit 105, unevenness occurs in the defocus map also due to the influence of variations that occur in an input signal. Moreover, unevenness occurs in the defocus map also when a desired C(kj) cannot be calculated because the subject has low contrast, and when the defocus amounts fluctuate significantly as SLOP shown in FIG. 6 decreases.

In contrast, in the present embodiment, outliers and unevenness can be removed and the expanding defocus amounts can be reduced by applying filter processing as will be described later. This can suppress the formation of holes in an object region attributed to outliers and unevenness included in the defocus map, and suppress the expansion of the object region attributed to the expansion of the defocus amounts.

Returning to FIG. 4, in step S402, the outlier/unevenness removal filter unit 301 applies filter processing to the defocus map generated in step S401. In the present embodiment, it will be assumed that the outlier/unevenness removal filter unit 301 applies a median filter to the defocus map. In order to apply the median filter, the outlier/unevenness removal filter unit 301 rearranges pixel values of the target pixel and eight pixels surrounding the target pixel in a descending or ascending order and, with reference to a reference pixel whose pixel value is a median value, selects and outputs this pixel value as a pixel value of the target pixel. For example, provided that the pixel 802 in FIG. 8B is used as the target pixel, its pixel value after the median filtering is 128. On the other hand, when the pixel 803 in FIG. 8D is used as the target pixel, its pixel value after the median filtering is 128. In this way, the pixel value (defocus amount) of the target pixel is corrected to a value range indicating defocus amounts of the subject that surround the target pixel.

Figure 9:
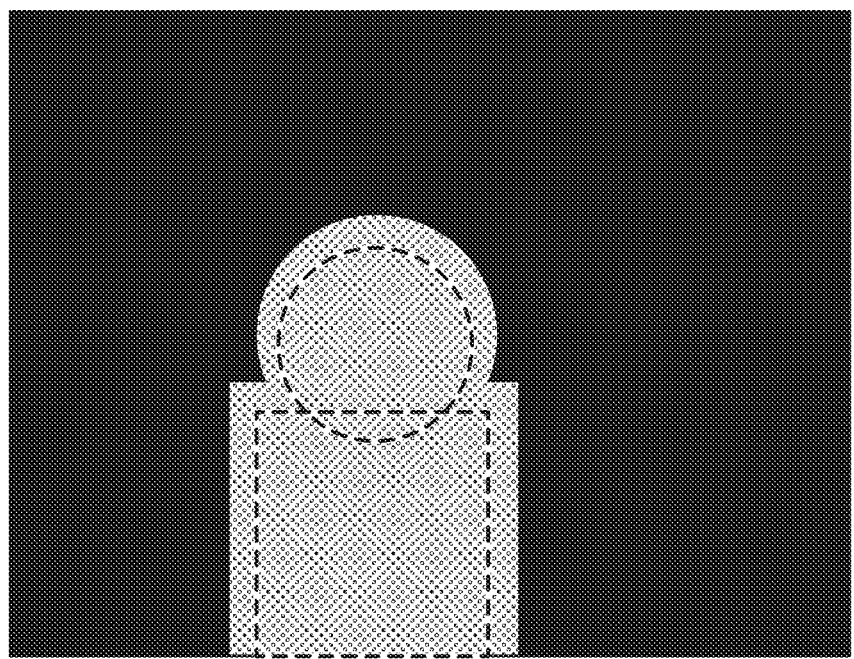
FIG. 9 is a diagram showing the defocus map after median filtering.

FIG. 9 shows the defocus map after the median filtering. It can be understood from FIG. 9 that outliers and unevenness have disappeared from the defocus map. Note that a pixel region to which the median filter is applied is not limited to a 3×3 pixel region including the target pixel and eight pixels surrounding the target pixel, and may be, for example, a 5×5 pixel region centered on the target pixel.

Also note that the filter applied to the defocus map by the outlier/unevenness removal filter unit 301 is not limited to the median filter. Outliers and unevenness in the defocus map are equivalent to a state where a pixel value of a specific pixel deviates from the tendency of pixel values of a plurality of pixels surrounding the specific pixel in the defocus map. Therefore, the outlier/unevenness removal filter unit 301 can use any filter that changes the pixel value of the target pixel that deviates from the tendency of the pixel values of the plurality of surrounding pixels in the defocus map so as to reduce the extent of the deviation from the tendency.

In step S403, the reduction filter unit 302 applies filter processing to the defocus map from which outliers and unevenness have been removed in step S402. It will be assumed here that the reduction filter unit 302 applies a minimum filter to the defocus map.

Figure 10A:
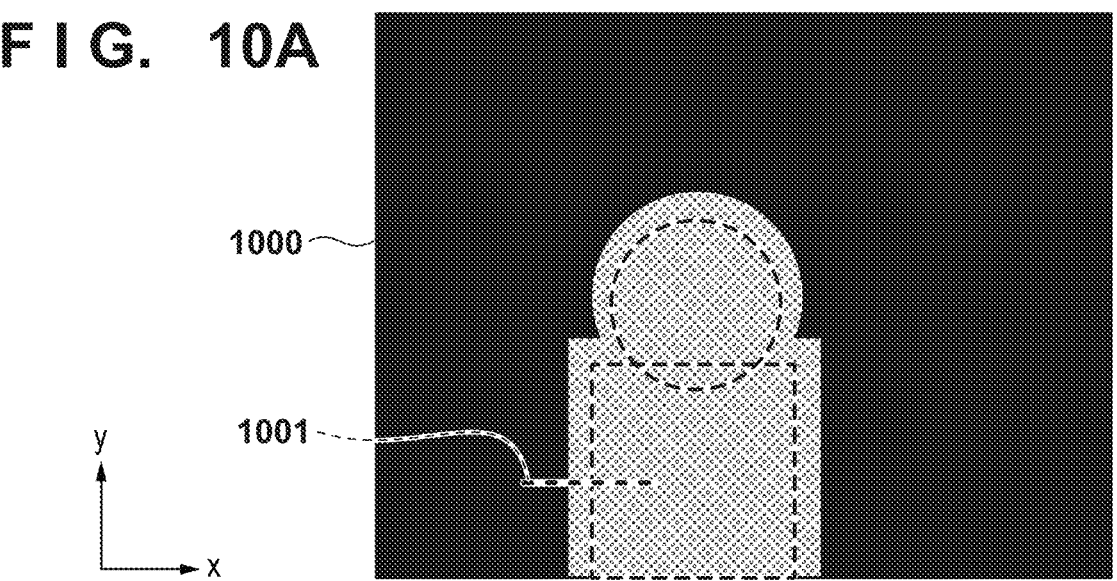
FIGS. 10A to 10C are diagrams illustrating processing of applying a minimum filter to the defocus map.
Figure 10B:
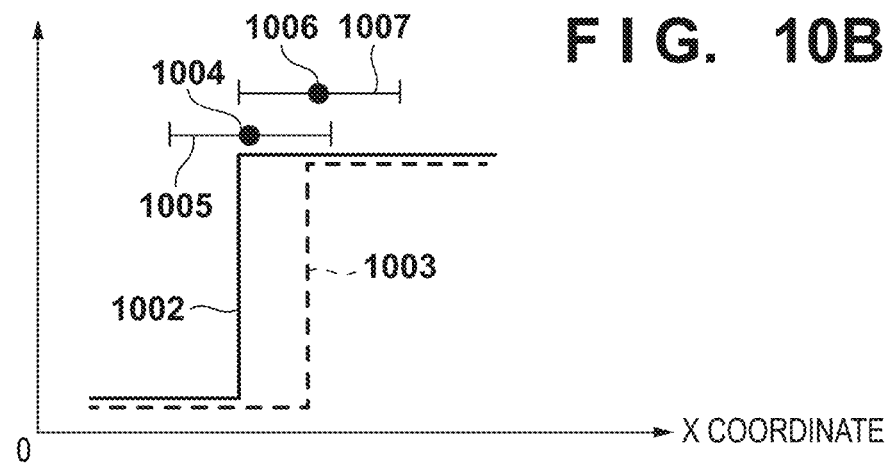
Figure 10C:
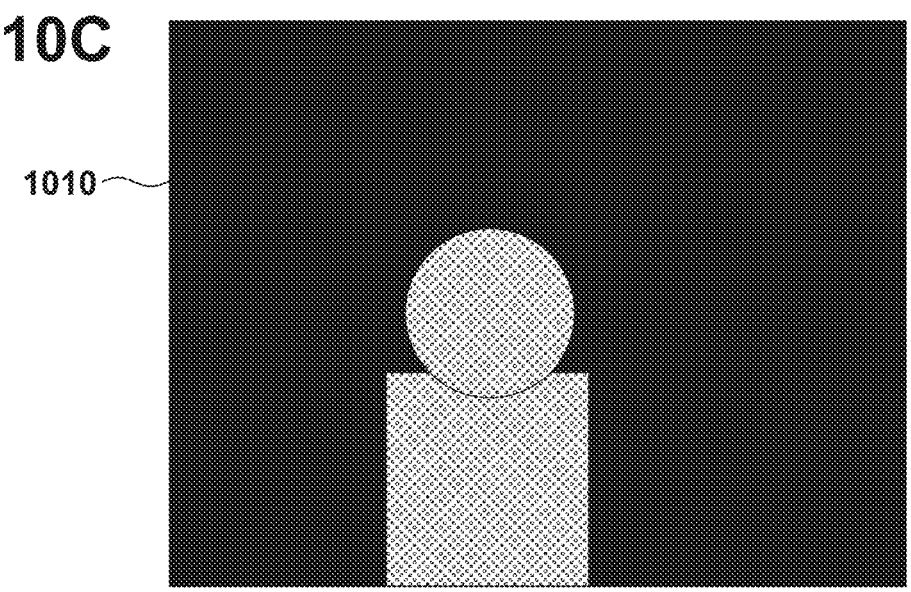

FIGS. 10A to 10C are diagrams illustrating the processing of applying the minimum filter to the defocus map. A defocus map 1000 in FIG. 10A is a defocus map obtained through the processing of step S402. Reference sign 1002 in FIG. 10B represents a pixel value profile in a cross-section 1001 of FIG. 10A; here, x-coordinates are taken along a horizontal axis, and pixel values are taken along a vertical axis. Reference sign 1003 of FIG. 10B represents the boundary of the subject. Reference signs 1004 and 1006 of FIG. 10B represent a target pixel position of the minimum filter. Reference signs 1005 and 1007 of FIG. 10B represent a reference width of the minimum filter. As the width of the expanding defocus amounts is 3, a portion that expanded in phase-difference detection can be reduced by matching the reference width of the minimum filter to the size m (here, 7) of one side of a minute block. FIG. 10C shows a defocus map 1010 after the minimum filter is applied.

Note that in the above description, it is assumed that the reduction filter unit 302 applies the minimum filter because the defocus map is configured in such a manner that the closer to the front, the whiter (the larger the pixel value). However, when the defocus map is configured in such a manner that the closer to the front, the blacker (the smaller the pixel value), the reduction filter unit 302 applies a maximum filter.

A description is now given of the advantageous effect of adopting the processing order in which a reduction filter is applied in step S403 after performing the filter processing of removing outliers and unevenness in step S402. If the reduction filter is applied first, the outlier indicated by the pixel 802 of FIG. 8B will spread to surrounding pixels, and outliers and unevenness cannot be sufficiently removed even by applying a filter for removing outliers and unevenness at a later time. By performing the filter processing of removing outliers and unevenness before applying the reduction filter, outliers and unevenness can be effectively removed.

Note that the filter applied to the defocus map by the reduction filter unit 302 is not limited to the minimum filter (or the maximum filter). The expansion in the defocus map occurs in a region of relatively short distances. Therefore, the reduction filter unit 302 can use any filter that reduces a distribution of ranges of predetermined pixel values in a distance map (for example, a region of relatively short distances).

Next, in step S404, the object region extraction unit 303 extracts an object region with reference to the defocus map obtained through the processing of step S403. Specifically, the object region extraction unit 303 extracts the object region in the defocus map with reference to information of a histogram for the defocus map.

Figure 11:
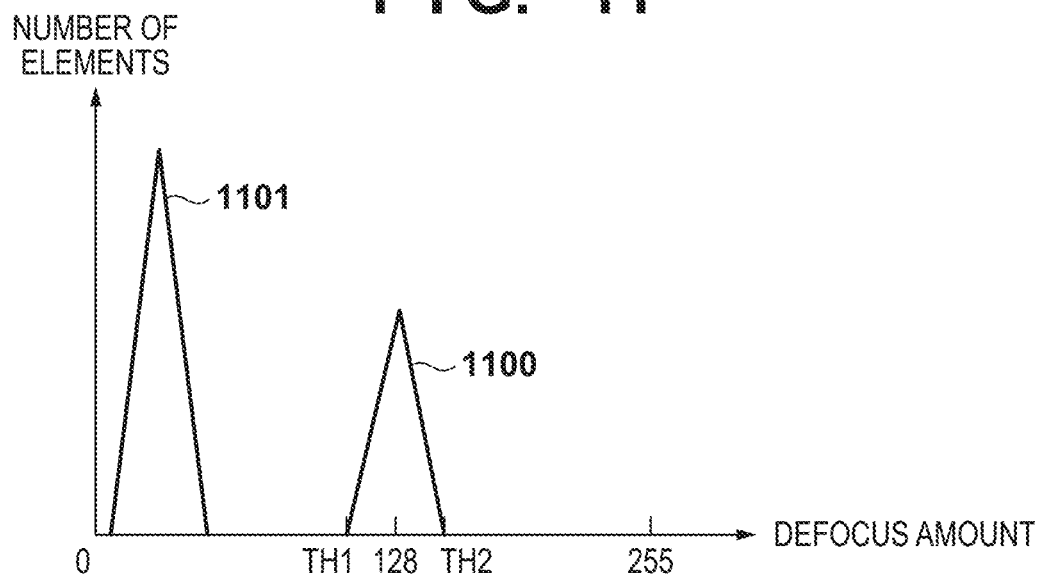
FIG. 11 is a diagram showing a histogram corresponding to a defocus map 1010 of FIG. 10C.

FIG. 11 is a diagram showing a histogram corresponding to the defocus map 1010 of FIG. 10C. Reference sign 1100 represents a peak of the histogram for the subject, and reference sign 1101 represents a peak of the histogram for the background region. The object region extraction unit 303 determines TH1 and TH2 from the peak (reference sign 1100) of the histogram including 128, which is a pixel value of a defocus amount indicating a focused state. As a result, the object region that has pixel values in a predetermined pixel value range in the distance map is identified. Then, when pixel values fall between TH1 and TH2 in the defocus map 1010, the object region extraction unit 303 sets 255 as pixel values of a map indicating the object region of the subject (hereinafter referred to as "object region map"). When pixel values do not fall between them, the object region extraction unit 303 sets 0 as pixel values of the object region map. As a result, the object region map that extracts the object region can be generated. In the object region map, the object region has pixel values included in a first pixel value range, whereas a region other than the object region has pixel values included in a second pixel value range that does not overlap the first pixel value range. In the above description, the first pixel value range includes only one pixel value of "255", and the second pixel value range includes only one pixel value of "0". However, each of the first pixel value range and the second pixel value range may include a plurality of pixel values, as long as the number of bits for a pixel value in the object region map is smaller than the number of bits for a pixel value in the defocus map.

If outliers and unevenness remain in a subject region in the defocus map, they are excluded from the object extraction, thereby forming holes in the object region map. In the present embodiment, the formation of holes in the object region map can be suppressed as outliers and unevenness can be suppressed in the defocus map.

Note that when a subject that is out of focus is extracted as the object region, provided that the subject is a person for example, it is sufficient to determine TH1 and TH2 from a peak of the histogram including a pixel value of an average defocus amount in a face region detected using a known face detection technique. Furthermore, it is possible to adopt a configuration in which the image processing apparatus 100 is provided with a display device, such as an LCD, and a user operation unit, the histogram for the defocus map is displayed, and a user designates TH1 and TH2. This configuration enables, for example, extraction of the background region as the object region.

Next, in step S405, the brightness correction unit 304 applies brightness correction processing to the image for still image recording, which is shown in FIG. 5, based on the object region map generated in step S404. For example, when shooting is performed in a backlit state, a region of a person is darkened; in this case, the brightness of a subject can be corrected by applying the brightness correction processing.

Note that although the present embodiment has described a configuration in which the defocus map is generated from the A image and the B image, which are the pair of parallax images, a method of generating the defocus map is not limited to this. In order to generate the defocus map, it is possible to adopt, for example, a configuration that uses a DFD (Depth From Defocus) method that obtains the defocus map from correlation between two images with different focuses and f-numbers. In this case also, defocus amounts are pulled toward higher contrast; thus, in an image with a focused subject and an image with a focused background, correlation obtained near a boundary of the subject indicates that defocus amounts of the subject expand to the outside of a subject region. Furthermore, outliers and unevenness occur in the defocus map depending on a pattern of the subject, a change in blurriness, S/N variations in pixels of the sensor, and the like. Therefore, also in the case where the DFD method is adopted, the object region can be extracted without sticking out of the subject region by applying image processing similar to the aforementioned image processing.

Furthermore, although a defocus distribution is used as a distribution of information related to a subject distance in the present embodiment, the distribution of information related to the subject distance is not limited to the defocus distribution. For example, as the distribution of information related to the subject distance, a distribution of shift amounts x (parallaxes) obtained using Expression 2 may be used, and a distribution of actual distances representing actual distances from an image capturing apparatus to the subject may be used.

Furthermore, as the distribution of information related to the subject distance, it is possible to adopt a configuration that uses a distribution of information related to a distance obtained from a distance measurement sensor module of, for example, a TOF (Time of Flight) method. In this case also, as the resolution of the distribution of information related to the distance obtained from the distance measurement sensor module is generally lower than the resolution of a still image for recording, when the distribution of information related to the distance is referred to after being enlarged to the resolution equivalent to the still image for recording, the distribution of information related to the subject distance expands to the outside of the subject region. Therefore, also in the case where the TOF method is adopted, the object region can be extracted without sticking out of the subject region by applying image processing similar to the aforementioned image processing.

As described above, various types of information can be used as the distribution of information related to the subject distance. In the present embodiment, such various types of information are collectively referred to as a "distance map". That is, although the processing of steps S402 to S404 in FIG. 4 can be applied to a defocus map, which is one example of the distance map that represents a distribution of information related to a distance in a depth direction of a shooting range using a distribution of pixel values, this processing can be applied also to any other types of distance maps.

Furthermore, in the above description, the defocus map generation unit 300 generates only the defocus map in step S401. However, in step S401, the defocus map generation unit 300 may generate a reliability map with respect to the defocus map in addition to the defocus map. Here, reliability is a value representing the extent of ease of detection of a shift amount that has been calculated in step S401 and has high correlation with the A image and the B image in a target region. As a defocus amount calculated in a region in which a shift amount is not easily detected has a high possibility of being incorrect, its reliability is set to be low. The region in which the shift amount is not easily detected is, for example a region in which there is little change in a pattern of the subject, such as the sky and an automobile body. The defocus map generation unit 300 detects such a region and assigns low reliability thereto. An edge integral value can be used as an index for determining whether there is little change in a pattern. Specifically, when calculating correlation amounts in step S401, the defocus map generation unit 300 calculates an edge integral value by integrating an absolute value of an edge amplitude of the data series that have been referred to. Then, the defocus map generation unit 300 assigns reliability in such a manner that the larger the edge integral value, the higher the reliability. By repeatedly performing this processing on a per-target pixel basis, the reliability map can be generated with respect to the defocus map. Then, before the processing of applying the filter for removing outliers and unevenness is performed in step S402, the defocus map generation unit 300 performs processing of replacing a pixel value of a defocus amount in an area to which low reliability is assigned with, for example, 0 or the like with reference to the reliability map.

Furthermore, in the above description, it is assumed that the processing of generating the object region map (step S404) is performed after the filter processing of removing outliers and unevenness (step S402) and the reduction filter processing (step S403). However, a timing to perform the processing of generating the object region map is not limited to the aforementioned timing. The image processing unit 107 may generate the object region map with reference to histogram information when the defocus map has been generated in step S401. In this case, in steps S402 and S403, the filter processing is performed with respect to the object region map instead of the defocus map. In this case, when applying the median filter for removing outliers and unevenness in step S402, the image processing unit 107 can achieve the advantageous effects of the median filter simply by counting the number of pixel values of 0 or 255 from among binarized pixels and outputting a pixel value of a higher count. Therefore, unlike the case where the median filter is applied to the defocus map of multiple values, the load on computation can be reduced as there is no need to rearrange pixel values of all pixels to be referred to in a descending or ascending order.

Furthermore, although it is assumed in the above description that the object region map has two values, the present embodiment is not limited to this, and the object region map may be a grayscale map of multiple values. In this case, a change in defocus amounts in the subject and the background region can be smoothed as the reduction filter unit 302 applies an LPF (low-pass filter) to the object region map (grayscale map) of multiple values. Also, an image that shows a smooth change in brightness at a boundary can be generated by performing the brightness correction processing using the object region map of multiple values as an α map.

Furthermore, although the brightness correction processing is applied to the image for still image recording based on the object region map generated by the image processing apparatus 100 in the above description, the present embodiment is not limited to this. For example, it is possible to adopt a configuration in which recording control of recording the object region map in the recording medium 108 in association with a still image is performed, and an external image processing apparatus applies the brightness correction processing to the still image based on the object region map.

As described above, according to the first embodiment, the image processing apparatus 100 applies a filter for removing outliers and unevenness (for example, the median filter) to the defocus map. Thereafter, the image processing apparatus 100 applies the filter for reducing the expanding defocus amounts (for example, the minimum filter) to the defocus map. This can improve the accuracy of a distribution of information related to a subject distance, such as the defocus map.

Second Embodiment

A second embodiment describes a configuration in which shaping processing is performed with respect to a defocus map to which a reduction filter (for example, a minimum filter) has been applied. This configuration enables extraction of an object region that lies accurately along the shape of a boundary of a subject. In the present embodiment, a basic configuration of an image processing apparatus 100 is similar to that in the first embodiment. The following mainly describes differences from the first embodiment.

Figure 12:
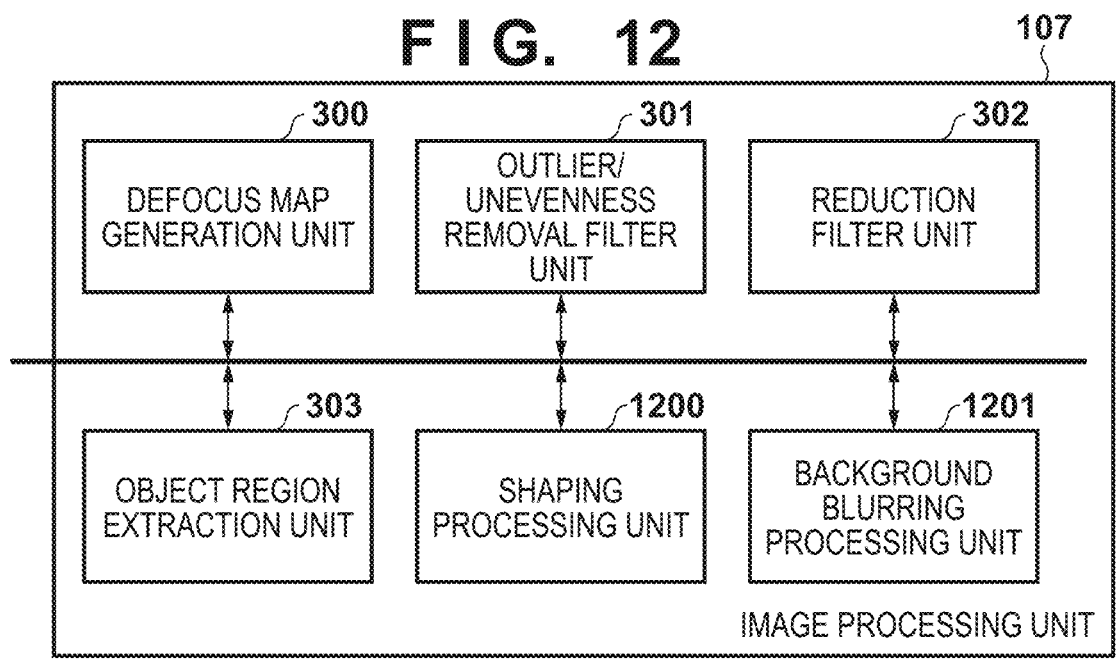
FIG. 12 is a block diagram showing an example of a specific configuration of an image processing unit 107 of an image processing apparatus 100 according to a second embodiment.

FIG. 12 is a block diagram showing an example of a specific configuration of an image processing unit 107 of the image processing apparatus 100 according to the second embodiment. As shown in FIG. 12, the image processing unit 107 includes a defocus map generation unit 300, an outlier/unevenness removal filter unit 301, a reduction filter unit 302, and an object region extraction unit 303. These units are respectively the same as those according to the first embodiment shown in FIG. 3. In addition, the image processing unit 107 includes a shaping processing unit 1200 and a background blurring processing unit 1201.

Note that the reduction filter unit 302 can select a minimum (maximum) filter and an LPF. When the LPF is selected, it is preferable to adopt a configuration that reduces the extent by which defocus amounts expand to the outside of a subject region by setting the filter width to be larger than the width of phase-difference detection at the time of generation of a defocus map.

Figure 13:
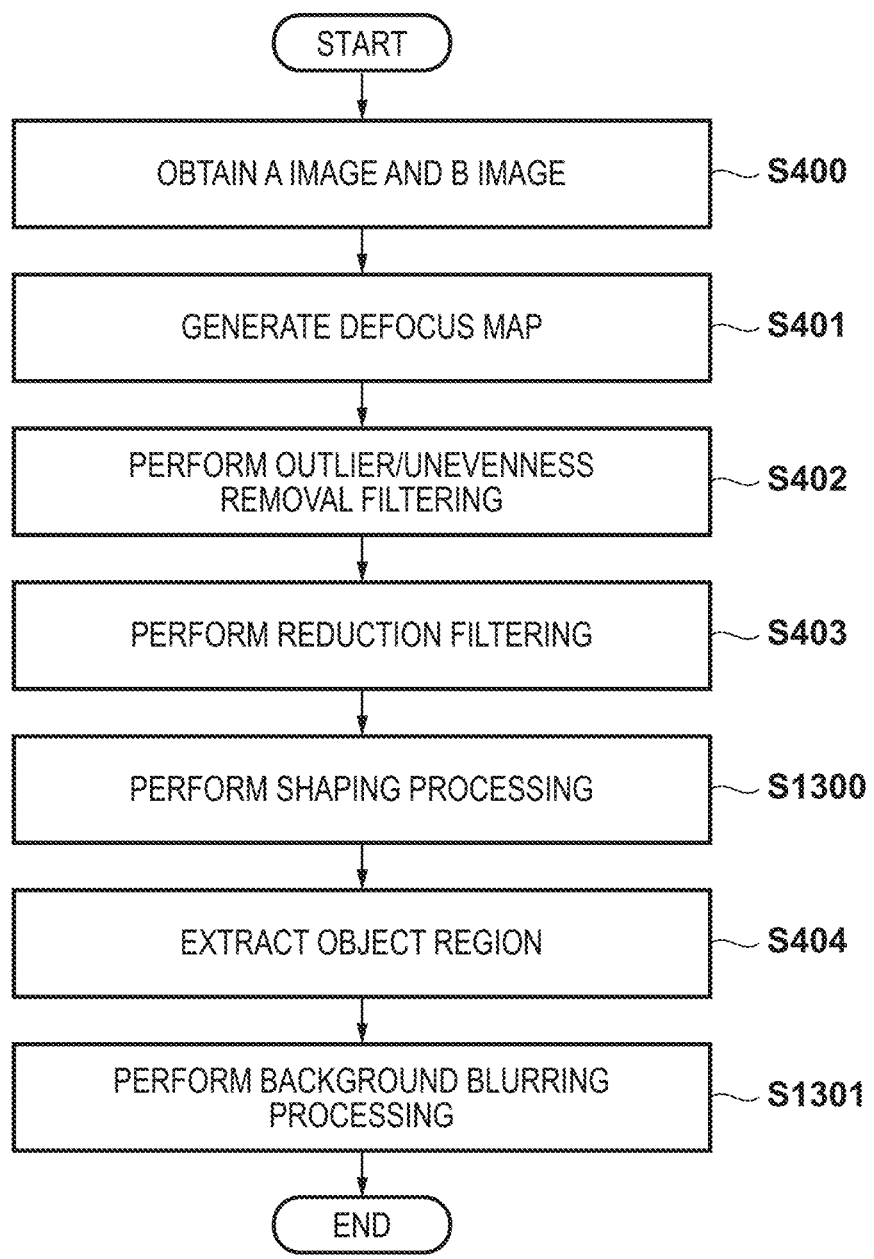
FIG. 13 is a flowchart of image processing executed by the image processing unit 107 according to the second embodiment.

Below, image processing executed by the image processing unit 107 will be described with reference to FIG. 13. FIG. 13 is a flowchart of the image processing executed by the image processing unit 107 according to the second embodiment. The image processing unit 107 executes the image processing of the present flowchart under control of the system control unit 101.

The processing of steps S400 to S403 is similar to the processing of steps S400 to S403 shown in FIG. 4.

In step S1300, using an image for shaping, the shaping processing unit 1200 performs shaping processing with respect to a defocus map to which a reduction filter was applied in step S403. Hereinafter, the defocus map after the shaping processing will be referred to as a shaped defocus map. Furthermore, it will be assumed that an image for still image recording obtained by adding an A image and a B image obtained in step S400 is used as the image for shaping. Note that the image for shaping according to the present embodiment is not limited to the image for still image recording, and the A image or B image may be used as the image for shaping, for example.

The first embodiment has described a method of extracting an object region from the defocus map to which the reduction filter was applied. The reduction filter is a technique that is effective in reducing the expanding defocus amounts in the width to be referred to. However, when the shape of a boundary of an object is complicated, it is difficult to extract a region along the boundary of the object on a per-pixel basis. In view of this, the object region can be extracted with higher accuracy by performing the shaping processing described below, even if the object's boundary has a complicated shape.

With reference to the image for shaping, the shaping processing unit 1200 applies bilateral filter processing to the defocus map. The bilateral filter processing is disclosed in, for example, Japanese Patent Laid-Open No. 2017-11652, and provided that the filter result of a target pixel position p is denoted by Jp, Jp is represented by the following Expression 7.

$$Jp = (1/Kp)\Sigma \Pi q \cdot f(|p-q|) \cdot g(|I2p - I2q|) \qquad \text{Expression 7}$$

Note that the meanings of the respective symbols in Expression 7 are as follows.

q: a surrounding pixel position
Ω: a region to be accumulated, centered on a target pixel position p
Σ: accumulation in the range of q∈Ω
I1q: a defocus map pixel value at a surrounding pixel position q
f(|p−q|): Gaussian function centered on a target pixel position p I2p: a pixel value of the image for shaping at a target pixel position p I2q: a pixel value of the image for shaping at a surrounding pixel position q g(|I2p−I2q|): Gaussian function centered on a pixel value I2p of the image for shaping Kp: a normalization coefficient, an accumulated value by an f·g weight According to Expression 7, if the difference between the pixel value I2p at a target pixel position p and the pixel value I2q at a surrounding pixel position q is small (that is, if the pixel value of the target pixel is close to the pixel value of the surrounding pixel in the image for shaping), the f·g weight (the weight for smoothing) for the surrounding pixel increases. In general, the pixel value of a target pixel and the pixel values of pixels surrounding the target pixel in the same subject tend to be close to one other. On the other hand, when a surrounding pixel belongs to a different subject (for example, a background region), its pixel value tends to have a large deviation from the pixel value of the target pixel, and thus performing the computation of Expression 7 has the advantageous effect of generating pixel values with reference to only defocus amounts of the same subject. Therefore, by extracting an object region from the shaped defocus map, the object region can be extracted with high accuracy even if its shape is complicated. That is, shaping processing using the bilateral filter has the advantageous effects of the reduction filter. However, if defocus amounts of a subject exist in a background region as a result of expanding to the outside of a subject region, a target pixel belongs to the background region whereas the defocus amounts belong to the subject region. For this reason, in order to change a defocus amount of the target pixel into a defocus amount of the background region, a large range needs to be set as the region to be accumulated Ω, thereby significantly increasing the load on computation. In view of this, by adopting the configuration of the present embodiment in which the shaping processing is performed after reducing the expansion included in the defocus map using the reduction filter, highly efficient computation can be performed, and the object region can be extracted with high accuracy.

In the example of FIG. 13, the image processing unit 107 removes outliers and unevenness from the defocus map then reduces the expanding defocus amounts, and thereafter, further extracts the object region based on the defocus map to which the shaping processing has been applied. In this way, the formation of holes in the object region caused by the outliers and unevenness can be suppressed, and the object region that lies accurately along the shape of a boundary of a subject can be extracted without sticking out of the subject region.

Note that the filter applied to the defocus map by the shaping processing unit 1200 is not limited to the bilateral filter. The shaping processing unit 1200 can use any filter that changes the pixel value of the target pixel in a distance map so that the similarity between the target pixel and a plurality of surrounding pixels in the distance map becomes close to the similarity between the target pixel and the plurality of surrounding pixels in a shot image.

The processing of step S404 is similar to the processing of step S404 shown in FIG. 4.

In step S1301, based on an object region map generated in step S404, the background blurring processing unit 1201 applies blurring processing to the background region in the image for still image recording shown in FIG. 5. By adding blur to the image for still image recording, an image with more emphasis on perspective can be generated. Furthermore, by applying edge enhancement to the object region, the advantageous effects can be more emphasized.

In the above description, it is assumed that the processing of generating the object region map (step S404) is performed after the filter processing of removing outliers and unevenness (step S402), the reduction filter processing (step S403), and the shaping processing (step S1300). However, a timing to perform the processing of generating the object region map is not limited to the aforementioned timing. The image processing unit 107 may generate the object region map with reference to histogram information when the defocus map has been generated in step S401. In this case, in steps S402, S403, and S1300, the filter processing and the shaping processing are performed with respect to the object region map instead of the defocus map. In this case, when applying the median filter for removing outliers and unevenness in step S402, the image processing unit 107 can achieve the advantageous effects of the median filter simply by counting the number of pixel values of 0 or 255 from among binarized pixels and outputting a pixel value of a higher count. Therefore, unlike the case where the median filter is applied to the defocus map of multiple values, the load on computation can be reduced as there is no need to rearrange pixel values of all pixels to be referred to in a descending or ascending order.

Furthermore, although the background blurring processing is applied to the image for still image recording based on the object region map generated by the image processing apparatus 100 in the above description, the present embodiment is not limited to this. For example, it is possible to adopt a configuration in which recording control of recording the object region map in a recording medium 108 in association with a still image is performed, and an external image processing apparatus applies the background blurring processing to the still image based on the object region map.

As described above, according to the second embodiment, the image processing apparatus 100 applies the filter for reducing the expanding defocus amounts (for example, the minimum filter) to the defocus map. Thereafter, the image processing apparatus 100 performs the shaping processing (for example, applies the bilateral filter) based on a shot image with respect to the defocus map. This can improve the accuracy of a distribution of information related to a subject distance, such as the defocus map.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-130009, filed Jul. 9, 2018 which is hereby incorporated by reference herein in its entirety.

What is claimed is:

1. An image processing apparatus comprising:
one or more processors; and
a memory storing instructions which, when executed by the one or more processors, cause the image processing apparatus to function as:
an obtaining unit configured to obtain a distance map and a shot image, the distance map representing a distribution of information related to a distance in a depth direction of a shooting range using a distribution of distance values, the shot image corresponding to the shooting range,
a first filter unit configured to apply a first filter to the distance map,
a second filter unit configured to apply a second filter to the distance map to which the first filter has been applied, and
a third filter unit configured to apply a third filter to the distance map obtained by the obtaining unit before the first filter is applied thereto,
wherein the first filter is a filter that reduces a distribution of distance values in a predetermined distance value range in the distance map,
the second filter is a filter that changes a distance value of a target distance in the distance map using weighted averaging that gives more weight to a distance value that is closer in position to the target distance, and
the third filter is a filter that changes a distance value of a target position that deviates from a tendency of a plurality of surrounding distance values in the distance map so as to reduce an extent of the deviation from the tendency.

2. The image processing apparatus according to claim 1, wherein the distance map is configured so that the closer to a front in the depth direction, the larger a distance value, and the first filter is a minimum filter.

3. The image processing apparatus according to claim 1, wherein the distance map is configured so that the closer to a front in the depth direction, the smaller a distance value, and the first filter is a maximum filter.

4. The image processing apparatus according to claim 1, wherein the first filter is a low-pass filter.

5. The image processing apparatus according to claim 1, wherein the instructions, when executed by the one or more processors, further cause the image processing apparatus to function as
an identification unit configured to identify an object region having a distance value in a predetermined distance value range in the distance map to which the second filter has been applied.

6. The image processing apparatus according to claim 5, wherein the instructions, when executed by the one or more processors, further cause the image processing apparatus to function as
an image processing unit configured to perform brightness correction processing or background blurring processing with respect to the shot image based on the object region.

7. The image processing apparatus according to claim 5, wherein the instructions, when executed by the one or more processors, further cause the image processing apparatus to function as
a recording control unit configured to record information indicating the object region and the shot image in association with each other in a recording unit.

8. The image processing apparatus according to claim 1, wherein the second filter is a bilateral filter.

9. The image processing apparatus according to claim 1, wherein the second filter is a filter that changes a distance value of a target distance in the distance map so that a similarity between the target distance and a plurality of surrounding distances in the distance map becomes close to a similarity between a target pixel and a plurality of surrounding pixels in the shot image.

10. The image processing apparatus according to claim 1, wherein the third filter is a median filter.

11. An image processing apparatus comprising:
one or more processors; and
a memory storing instructions which, when executed by the one or more processors, cause the image processing apparatus to function as:
an obtaining unit configured to obtain a distance map and a shot image, the distance map representing a distribution of information related to a distance in a depth direction of a shooting range using a distribution of distance values, the shot image corresponding to the shooting range,
a generation unit configured to generate an object region map which indicates an object region having a distance value in a predetermined distance value range in the distance map, wherein in the object region map, the object region has a pixel value included in a first pixel value range and a region other than the object region has a pixel value included in a second pixel value range that does not overlap the first pixel value range,
a first filter unit configured to apply a first filter to the object region map,
a second filter unit configured to apply a second filter to the object region map to which the first filter has been applied, and
a third filter unit configured to apply a third filter to the object region map generated by the generation unit before the first filter is applied thereto,
wherein a number of bits for a pixel value in the object region map is smaller than a number of bits for a distance value in the distance map,
the first filter is a filter that reduces the object region in the object region map,
the second filter is a filter that changes a pixel value of a target pixel in the object region map so that a similarity between the target pixel and a plurality of surrounding pixels in the object region map becomes close to a similarity between the target pixel and the plurality of surrounding pixels in the shot image, and the third filter is a filter that changes a pixel value of a target pixel that deviates from a tendency of a plurality of surrounding pixel values in the object region map so as to reduce an extent of the deviation from the tendency.

12. An image capturing apparatus, comprising:
the image processing apparatus according to claim 1; and
an image capturing unit.

13. An image processing method executed by an image processing apparatus, comprising:
obtaining a distance map and a shot image, the distance map representing a distribution of information related to a distance in a depth direction of a shooting range using a distribution of distance values, the shot image corresponding to the shooting range,
applying a first filter to the distance map,
applying a second filter to the distance map to which the first filter has been applied, and
applying a third filter unit configured to apply a third filter to the distance map obtained by the obtaining unit before the first filter is applied thereto,
wherein the first filter is a filter that reduces a distribution of distance values in a predetermined distance value range in the distance map,
the second filter is a filter that changes a distance value of a target distance in the distance map using weighted averaging that gives more weight to a distance value that is closer in position to the target distance, and
the third filter is a filter that changes a pixel value of a target pixel that deviates from a tendency of a plurality of surrounding pixel values in the object region map so as to reduce an extent of the deviation from the tendency.

14. An image processing method executed by an image processing apparatus, comprising:
obtaining a distance map and a shot image, the distance map representing a distribution of information related to a distance in a depth direction of a shooting range using a distribution of distance values, the shot image corresponding to the shooting range,
generating an object region map which indicates an object region having a distance value in a predetermined distance value range in the distance map, wherein in the object region map, the object region has a pixel value included in a first pixel value range and a region other than the object region has a pixel value included in a second pixel value range that does not overlap the first pixel value range,
applying a first filter to the object region map,
applying a second filter to the object region map to which the first filter has been applied,
applying a third filter unit configured to apply a third filter to the distance map obtained by the obtaining unit before the first filter is applied thereto,
wherein a number of bits for a pixel value in the object region map is smaller than a number of bits for a distance value in the distance map,
the first filter is a filter that reduces the object region in the object region map,
the second filter is a filter that changes a pixel value of a target pixel in the object region map so that a similarity between the target pixel and a plurality of surrounding pixels in the object region map becomes close to a similarity between the target pixel and the plurality of surrounding pixels in the shot image, and
the third filter is a filter that changes a distance value of a target position that deviates from a tendency of a plurality of surrounding distance values in the distance map so as to reduce an extent of the deviation from the tendency.

15. A non-transitory computer-readable storage medium which stores a program for causing a computer to execute an image processing method comprising:
obtaining a distance map and a shot image, the distance map representing a distribution of information related to a distance in a depth direction of a shooting range using a distribution of distance values, the shot image corresponding to the shooting range,
applying a first filter to the distance map,
applying a second filter to the distance map to which the first filter has been applied, and
applying a third filter unit configured to apply a third filter to the distance map obtained by the obtaining unit before the first filter is applied thereto,
wherein the first filter is a filter that reduces a distribution of distance values in a predetermined distance value range in the distance map,
the second filter is a filter that changes a distance value of a target distance in the distance map using weighted averaging that gives more weight to a distance value that is closer in position to the target distance, and
the third filter is a filter that changes a distance value of a target position that deviates from a tendency of a plurality of surrounding distance values in the distance map so as to reduce an extent of the deviation from the tendency.

16. A non-transitory computer-readable storage medium which stores a program for causing a computer to execute an image processing method comprising:
obtaining a distance map and a shot image, the distance map representing a distribution of information related to a distance in a depth direction of a shooting range using a distribution of distance values, the shot image corresponding to the shooting range,
generating an object region map which indicates an object region having a distance value in a predetermined distance value range in the distance map, wherein in the object region map, the object region has a pixel value included in a first pixel value range and a region other than the object region has a pixel value included in a second pixel value range that does not overlap the first pixel value range,
applying a first filter to the object region map,
applying a second filter to the object region map to which the first filter has been applied, and
applying a third filter unit configured to apply a third filter to the distance map obtained by the obtaining unit before the first filter is applied thereto,
wherein a number of bits for a pixel value in the object region map is smaller than a number of bits for a distance value in the distance map,
the first filter is a filter that reduces the object region in the object region map,
the second filter is a filter that changes a pixel value of a target pixel in the object region map so that a similarity between the target pixel and a plurality of surrounding pixels in the object region map becomes close to a similarity between the target pixel and the plurality of surrounding pixels in the shot image, and
the third filter is a filter that changes a distance value of a target position that deviates from a tendency of a plurality of surrounding distance values in the distance map so as to reduce an extent of the deviation from the tendency.

* * * * *